(12) United States Patent
Testa et al.

(10) Patent No.: US 10,917,707 B2
(45) Date of Patent: Feb. 9, 2021

(54) NETWORK AND METHOD FOR A DATA CENTER

(71) Applicant: Telefonaktiebolaget LM Ericsson (publ), Stockholm (SE)

(72) Inventors: Francesco Testa, Pisa (IT); Alberto Bianchi, Pisa (IT); Filippo Ponzini, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/478,306
(22) PCT Filed: Jan. 19, 2017
(86) PCT No.: PCT/EP2017/051115
§ 371 (c)(1),
(2) Date: Jul. 16, 2019
(87) PCT Pub. No.: WO2018/133941
PCT Pub. Date: Jul. 26, 2018

(65) Prior Publication Data
US 2019/0373346 A1 Dec. 5, 2019

(51) Int. Cl.
*H04Q 11/00* (2006.01)
*H04L 12/931* (2013.01)

(52) U.S. Cl.
CPC ....... *H04Q 11/0062* (2013.01); *H04L 49/357* (2013.01); *H04Q 11/0005* (2013.01);
(Continued)

(58) Field of Classification Search
CPC combination set(s) only.
See application file for complete search history.

(56) References Cited

U.S. PATENT DOCUMENTS 6,650,803 B1 * 11/2003 Ramaswami ....... H04J 14/0293
385/15

8,867,915 B1   10/2014 Vahdat et al.
(Continued)

OTHER PUBLICATIONS

Kai Chen, "OSA_An_Optical_Switching_Architecture_Data_Center_Networks_Unprecedented_Flexibility",IEEE/ACM Transactions on Networking, vol. 22, No. 2, Apr. 2014, pp. 498-509.*
(Continued)

*Primary Examiner* — Omar S Ismail
(74) *Attorney, Agent, or Firm* — Murphy, Bilak & Homiller, PLLC

(57) ABSTRACT

A network (100) for a data center is disclosed. The network comprises computing resources (120), storage resources (110), and a switching apparatus (130). The switching apparatus (130) comprises a plurality of electrical switching components (140) configured to provide packet switching for traffic between computing resources or between computing and storage resources, and an optical switching fabric (150) configured to select an electrical switching component to provide packet switching between computing resources (120) and to provide connectivity between the plurality of electrical switching components (140) and the computing and storage resources (120, 110). Also disclosed is a method (400) for configuring a Virtual Performance Optimised Data Center (vPOD) in a network. The method comprises assigning computing resources of the network to the vPOD (410), assigning storage resources of the network to the vPOD (420) and assigning at least one of a plurality of electrical switching components of the network to provide packet switching for traffic between the computing resources of the vPOD or between the computing and storage resources of the vPOD (430). The method further comprises interconnecting the assigned computing and storage resources and the assigned at least one of a plurality of electrical switching components using an optical switching fabric (440).

18 Claims, 8 Drawing Sheets

(52) U.S. Cl.
CPC ........... *H04Q 2011/0039* (2013.01); *H04Q 2011/0052* (2013.01); *H04Q 2011/0086* (2013.01)

(56) References Cited

U.S. PATENT DOCUMENTS

| | | | | |
|---|---|---|---|---|
| 2003/0035166 | A1* | 2/2003 | Zhang | H04J 14/0278 398/58 |
| 2008/0075071 | A1* | 3/2008 | Beshai | H04Q 11/0005 370/386 |
| 2008/0247387 | A1* | 10/2008 | Neilson | H04Q 11/0005 370/386 |
| 2012/0328292 | A1* | 12/2012 | Testa | H04Q 11/0005 398/49 |
| 2013/0089089 | A1* | 4/2013 | Kamath | H04L 12/413 370/358 |
| 2015/0043905 | A1 | 2/2015 | Graves et al. | |
| 2015/0147060 | A1* | 5/2015 | Patel | H04J 14/0202 398/48 |
| 2015/0181317 | A1* | 6/2015 | Yin | H04L 49/356 398/45 |
| 2015/0289035 | A1* | 10/2015 | Mehrvar | H04Q 11/0066 398/51 |
| 2016/0044393 | A1* | 2/2016 | Graves | H04L 45/02 398/51 |
| 2016/0337723 | A1* | 11/2016 | Graves | H04Q 11/0003 |
| 2017/0099532 | A1* | 4/2017 | Kakande | H04L 45/24 |

OTHER PUBLICATIONS

Casimer DeCusatis, "Optical_Interconnect_Networks_Data_Communications", Journal of Lightwave Technology, vol. 32, No. 4, Feb. 15, 2014, pp. 544-548.*

Jordi Perelló, "All_Optical_Packet_Circuit_Switching_Based_Data_Center_Network_Enhanced_Scalability_Latency",IEEE Network, Nov./Dec. 2013, pp. 14-20.*

Limei Peng,Virtual_Pod_Assisted_Routing_Resource_Assignment_Elastic_All_Optical_Intra_Datacenter_Networks, IEEE Access, Oct. 11, 2016,pp. 406-4016.*

Nathan Farrington,"Helios_Hybrid_Electrical_Optical_Switch_Architecture_Modular_Data_Centers",SIGCOMM'10, Aug. 30-Sep. 3, 2010, pp. 339-348.*

Barker, Kevin J, et al., "On the Feasibility of Optical Circuit Switching for High Performance Computing Systems", Seattle, Washington, USA, Nov. 12-18, 2005, pp. 1-22.

Budd, Russell A, et al., "Semiconductor Optical Amplifier (SOA) Packaging for Scalable and Gain-Integrated Silicon Photonic Switching Platforms", 2015 Electronic Components & Technology Conference, IBM T.J. Watson Research Center, 1101 Kitchawan Road, Yorktown Heights, NY 10598, USA, May 26-29, 2015, pp. 1280-1286.

Chen, Kai, et al., "OSA: An Optical Switching Architecture for Data Center Networks With Unprecedented Flexibility", IEEE/ACM Transactions on Networking, vol. 22, No. 2, Apr. 2014, pp. 498-511.

Farrington, Nathan , et al., "Hardware Requirements for Optical Circuit Switched Data Center Networks", To Appear in Optical Fiber Communication Conference (OFC/NFOEC), Mar. 6-10, 2011, pp. 1-3.

Seok, Tae Joon, et al., "64x64 Low-Loss and Broadband Digital Silicon Photonic MEMS Switches", 2015 European Conference on Optical Communication (ECOC), Sep. 27-Oct. 1, 2015, pp. 1-3.

Unknown, Author, "Breakthrough Computational and Operational Efficiency Improvement For Data Centers", LightConnect™ Fabric V-Pod Data Center Architecture; Calient Technologies, SDN At Light Speed, 2015, pp. 1-13.

Vahdat, Amin, "The Emerging Optical Data Center", 2011 Optical Fiber Communication Conference and Exposition and the National Fiber Optic Engineers Conference, Mar. 6-10, 2011, pp. 1-3.

* cited by examiner

NETWORK AND METHOD FOR A DATA CENTER

TECHNICAL FIELD

The present disclosure relates to a network for a data center. The present disclosure also relates to a method for configuring a Virtual Performance Optimised Data Center (vPOD) in a network. The present disclosure also relates to a controller and to a computer program product configured to carry out a method for configuring a vPOD in a network.

BACKGROUND

Typical commercial data centers are made up of tightly integrated hardware resources including Central Processing Units (CPUs), memory, disks, network adapters, forwarding elements, etc. If any of the hardware resources become a bottleneck for traffic processing then either the equipment must be replaced or new equipment must be added to satisfy new traffic demands. During normal operation of a data center, traffic demands may vary considerably, and consequently current practice is to over-build data center hardware resources so as to ensure that sufficient capacity is available to accommodate peak demand. This practice increases both the capital and operational expenses for those running the data center.

The explosive growth in mobile data usage and video content uptake in recent years are putting enormous load on the existing data center infrastructure. In the immediate future, the traffic load in data centers is expected to continue to grow exponentially owing to increasing mobile network speeds, massive use of cloud services, and increasing deployment of Machine Type Communication devices linked to the development of the Internet of Things. In order to accommodate this massive increase in traffic load, and the associated cost and energy consumption for data centers, there is a drive to increase the efficiency of hardware resource utilisation at the component level. Two concepts are emerging as integral to the implementation of such efficiency improvements: the 'virtual performance optimized data center' (vPOD) and 'hardware disaggregation'.

A vPOD defines a set of computing, network and storage hardware resources with internal networking between the servers and internal connectivity from servers to storage hardware. With a software defined infrastructure, resources may be organized as partitions of the physically installed resources. Each software defined partition is referred to as a virtual POD, vPOD, as the data center user will experience the partition as a separate POD. vPODs are characterized by immediate and high availability, and they are controlled separately via a data center control center. The concept of vPODs enables a range of different applications and virtualization solutions to be hosted within the same physical infrastructure, with vPOD pooled resources distributed across multiple racks, chassis, computing and storage units. As the content of each vPOD is software controlled, it is very simple to scale or modify a vPOD to make sure it is correctly sized for the relevant workload. Hardware utilisation is drastically increased, power consumption per application is decreased, and time to deployment of new applications and adjustments to new application workload situations are decreased. The vPOD concept allows for automation of vPOD content from any management system that is given the authority to modify or scale the vPOD composition of servers, storage and interconnecting networks.

Hardware disaggregation refers to the placement of computing, storage, and network resources in pools, with the ability to dynamically allocate such resources independently of their physical location. The resources may thus be physically separated so as to be located in different racks within the data center. This increases flexibility and facilitates reaction to peak traffic demand while ensuring optimal resource utilisation. For example, storage is no longer arranged as a series of storage arrays attached to each computing server, but is arranged as a pool of storage resources which may be centrally managed and allocated, reducing the storage demand for each server and allowing for storage resources to be rapidly reallocated to different servers (resource virtualization).

A typical electrical packet switching architecture for a disaggregated data center is illustrated in FIG. 1. The architecture is of the "leaf and spine" type, and is formed by interconnecting the many Ethernet switching elements 2 of the leaf level 4 with those of the spine level 6 using a folded Clos architecture. The maximum number of servers which may be interconnected by the switching architecture is determined by the number of switch element ports. Commercial switch elements available today have 128×128 ports at 25 Gbps (although 56 Gbps is the rate foreseen for future development), and this leads to a maximum number of interconnected servers of 8192, assuming a 2-stage folded Clos architecture and that each server has a 25 Gbps networking port.

In order to provide vPOD connectivity and intra-vPOD server communication necessary for the operation of vPODs, the electrical switching fabric in a data center has to be very large, arranged in a massive multi stage architecture comprising many switch units with a high cost, large footprint and high power consumption. Proposed hybrid data centers seek to replace some of the electrical spine switches in the standard leaf and spine architecture with Optical Circuit Switches (OCSs). The data flows are then subdivided into long lasting flows that are routed by the OCS based spine level, and short lived data flows that are switched by the electrical spine switches. An alternative arrangement proposes complete separation of the electrical and optical switching layers; servers and storage nodes having two interfaces, one for the optical switching layer for long lasting flows and one for the electrical switching layer for short lived flows. While such hybrid arrangements may provide an additional layer of flexibility to the electrical packet switching fabric, the overall size and complexity of the electrical switching fabric remains highly significant, with each switch unit typically comprising a 128×128 EPS surrounded by 128 Optical Electrical Optical (OEO) converters.

An additional issue with existing solutions for disaggregated data centers is that the signals to be exchanged among computing and storage nodes may use different protocols, including Ethernet, PCI-express, SAS, etc., depending on particular communication requirements (latency, speed etc.), while the electric switching fabric is specific to a particular protocol. This forces system developers to implement different types of switching fabrics in a data centers, each fabric able to switch signals of a single type. In such an arrangement, if a server has multiple communication interfaces it must be decided upfront to which EPS they have to be connected. Electrical switching fabrics also operate only with a single data rate (10 Gbps, 12 Gbps, 25 Gbps etc.). If in future product evolution, the communication interfaces of computing and storage nodes are increased to cope with predicted traffic growth, the complete switching fabric infrastructures will have to be replaced with new fabrics to handle the increased data rate. There remain therefore multiple challenges in the implementation of hardware disaggregation in data centers.

SUMMARY

According to a first aspect of the present disclosure, there is provided a network for a data center. The network comprises computing resources, storage resources and a switching apparatus. The switching apparatus comprises a plurality of electrical switching components configured to provide packet switching for traffic between computing resources or between computing and storage resources, and an optical switching fabric configured to select an electrical switching component to provide packet switching between computing resources and to provide connectivity between the plurality of electrical switching components and the computing and storage resources.

According to examples of the present disclosure, the optical switching fabric may be configured to select an electrical switching component to provide packet switching between computing resources belonging to the same vPOD.

According to examples of the present disclosure, the optical switching fabric may be configured to provide direct connectivity between computing and storage resources, or such connectivity may be provided via both the optical switching fabric and at least one of the plurality of electrical switching components. According to other examples of the present disclosure, the optical switching fabric may be configured to additionally provide direct connectivity between computing resources, for example in the case of long data flows exchanged between computing resources.

According to examples of the present disclosure, for traffic from a source computing resource to a destination computing resource, the optical switching fabric may be configured to convey the traffic from the source computing resource to a selected one of the plurality of electrical switching components, the selected one of the plurality of electrical switching components may be configured to packet switch the traffic to a selected port on a module of the optical switching fabric, and the optical switching fabric may be configured to convey the packet switched traffic to the destination computing resource.

According to examples of the present disclosure, the optical switching fabric and electrical switching components may be configured to perform similar functions for traffic between computing and storage resources.

According to examples of the present disclosure, the network may comprise a Software Defined Network (SDN) and may further comprise an SDN controller.

According to examples of the present disclosure, the computing and storage resources may be disaggregated. For the purposes of the present specification, "disaggregation" refers to the placement of computing, storage, and network resources in pools with the ability to dynamically allocate such resources independently of their physical location.

According to examples of the present disclosure, the computing resources may for example be servers.

According to examples of the present disclosure, the plurality of electrical switching components may comprise Electrical Packet Switches (EPSs).

According to examples of the present disclosure, the EPSs may be arranged in a single stage architecture, with each EPS being directly connected to the optical switching fabric as opposed to being connected via another EPS. In further examples, the EPSs may be arranged in a multi stage architecture with many chips interconnected to increase the packet switching capacity. According to examples of the present disclosure, the EPSs may be of varying sizes, and may for example include EPSs of 128×128, 256×256, 512× 512 or any other size.

According to examples of the present disclosure, the optical switching fabric may comprise at least one Optical Cross Connect (OXC), the OXC comprising a plurality of optical switching modules.

According to examples of the present disclosure, the optical switching modules may comprise at least one of silicon photonic switches or photonic integrated switches.

According to examples of the present disclosure, the switches may be 64×64 switches.

According to examples of the present disclosure, the optical switching fabric may comprise a first OXC configured to convey traffic in a first direction between the electrical switching components and the computing and storage resources, and a second OXC configured to convey traffic in a second direction between the electrical switching components and the computing and storage resources.

According to examples of the present disclosure, the first OXC may also be configured to convey traffic in a first direction between computing and storage resources, and the second OXC may be configured to convey traffic in a second direction between computing and storage resources.

According to examples of the present disclosure, at least a portion of the capacity of the OXC may be reserved for traffic in a first direction between the electrical switching components and the computing and storage resources and at least a portion of the capacity of the OXC may be reserved for traffic in a second direction between the electrical switching components and the computing and storage resources.

According to examples of the present disclosure, each optical switching module of the OXC may be partitioned to separate traffic in the first and second directions.

According to examples of the present disclosure, the optical switching modules of the OXC may be connected in a multi-stage architecture.

According to examples of the present disclosure, the multi stage architecture may be a Clos architecture and in particular a two stage folded Clos architecture.

According to examples of the present disclosure, at least some of the computing resources may be aggregated for connection to the optical switching fabric.

According to examples of the present disclosure, the switching apparatus may be configured to provide connectivity between the computing and storage resources and an external transport network.

According to examples of the present disclosure, the external transport network may connect the network to a public network such as the Internet, and via the Internet to end users and/or to other networks in other data centers.

According to examples of the present disclosure, at least one of the electrical switching components or the optical switching fabric may be connected to the external transport network.

According to examples of the present disclosure, either or both of the electrical switching components and optical switching fabric may be connected to the external transport network and so may receive incoming traffic to the data center network. According to examples of the present disclosure, if at least one of the electrical switching components is directly connected to the external transport network then at least a portion of ports on the electrical switching component may be reserved for traffic exchanged with the external transport network.

According to examples of the present disclosure, the network may further comprise a gateway between the external transport network and the optical switching fabric of the switching apparatus.

According to another aspect of the present disclosure, there is provided a method for configuring a Virtual Performance Optimised Data Center (vPOD) in a network. The method comprises assigning computing resources of the network to the vPOD, assigning storage resources of the network to the vPOD and assigning at least one of a plurality of electrical switching components of the network to provide packet switching for traffic between the computing resources of the vPOD or between the computing and storage resources of the vPOD. The method further comprises interconnecting the assigned computing and storage resources and the assigned at least one of a plurality of electrical switching components using an optical switching fabric.

According to examples of the present disclosure, the network may be a network according to any one of the preceding aspects or examples of the present disclosure, and the method may be performed by an SDN controller of the network.

According to examples of the present disclosure, a vPOD comprises a set of computing, network and storage hardware resources with internal networking between the computing resources and internal connectivity from computing to storage hardware. With a software defined infrastructure, resources may be organised as partitions of physically installed resources. Each software defined partition is referred to as a virtual POD or vPOD, as a data center user will experience the partition as a separate POD, and a single vPOD may present a complete and distinct Infrastructure as a Service (IaaS) environment to a customer. vPOD pooled resources may be distributed across multiple racks, chassis, computing and storage units within a data center. vPODs are characterized by immediate and high availability, and are controlled separately via a control center of the data center.

According to examples of the present disclosure, the method may further comprise dynamically adjusting at least one of the computing and storage resources or the at least one of a plurality of electrical switching components assigned to the vPOD according to workload requirements placed on the vPOD.

According to another aspect of the present disclosure, there is provided a computer program comprising instructions which, when executed on at least one processor, cause the at least one processor to carry out a method according to any of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a controller for configuring a vPOD in a network, the controller adapted to assign computing resources of the network to the vPOD, assign storage resources of the network to the vPOD and assign at least one of a plurality of electrical switching components of the network to provide packet switching for traffic between the computing resources of the vPOD or between the computing and storage resources of the vPOD. The controller is further adapted to interconnect the assigned computing and storage resources and the assigned at least one of a plurality of electrical switching components using an optical switching fabric.

According to another aspect of the present disclosure, there is provided a controller for configuring a vPOD in a network, the controller comprising a processor and a memory, the memory containing instructions executable by the processor such that the controller is operable to assign computing resources of the network to the vPOD, assign storage resources of the network to the vPOD, and assign at least one of a plurality of electrical switching components of the network to provide packet switching for traffic between the computing resources of the vPOD or between the computing and storage resources of the vPOD. The controller is further operative to interconnect the assigned computing and storage resources and the assigned at least one of a plurality of electrical switching components using an optical switching fabric.

According to another aspect of the present disclosure, there is provided a controller for configuring a vPOD in a network. The controller comprises a resource module for assigning computing resources of the network to the vPOD and for assigning storage resources of the network to the vPOD and a packet communication module for assigning at least one of a plurality of electrical switching components of the network to provide packet switching for traffic between the computing resources of the vPOD or between the computing and storage resources of the vPOD. The controller further comprises a connectivity module for interconnecting the assigned computing and storage resources and the assigned at least one of a plurality of electrical switching components using an optical switching fabric.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide a network for a data center in which a switching apparatus comprises both an optical switching fabric and a plurality of electrical switching components. The optical switching fabric may be used to provide connectivity between resources, including between computing resources within a vPOD, between computing and storage resources and/or between computing/storage resources and the electrical switching components. The electrical switching components may be used to provide packet switching for intra vPOD communication. During configuration of a vPOD, according to aspects of the present disclosure, the electrical switching components may be considered as resources available in a pool in a similar manner to the computing and storage resources. In some examples configuration of a vPOD may thus comprise assigning not only computing and storage resources to the vPOD but also at least one electrical switching component. Configuring the vPOD may then further comprise interconnecting the assigned computing and storage resources and the assigned electrical switching component or components using the optical switching fabric.

Figure 1:
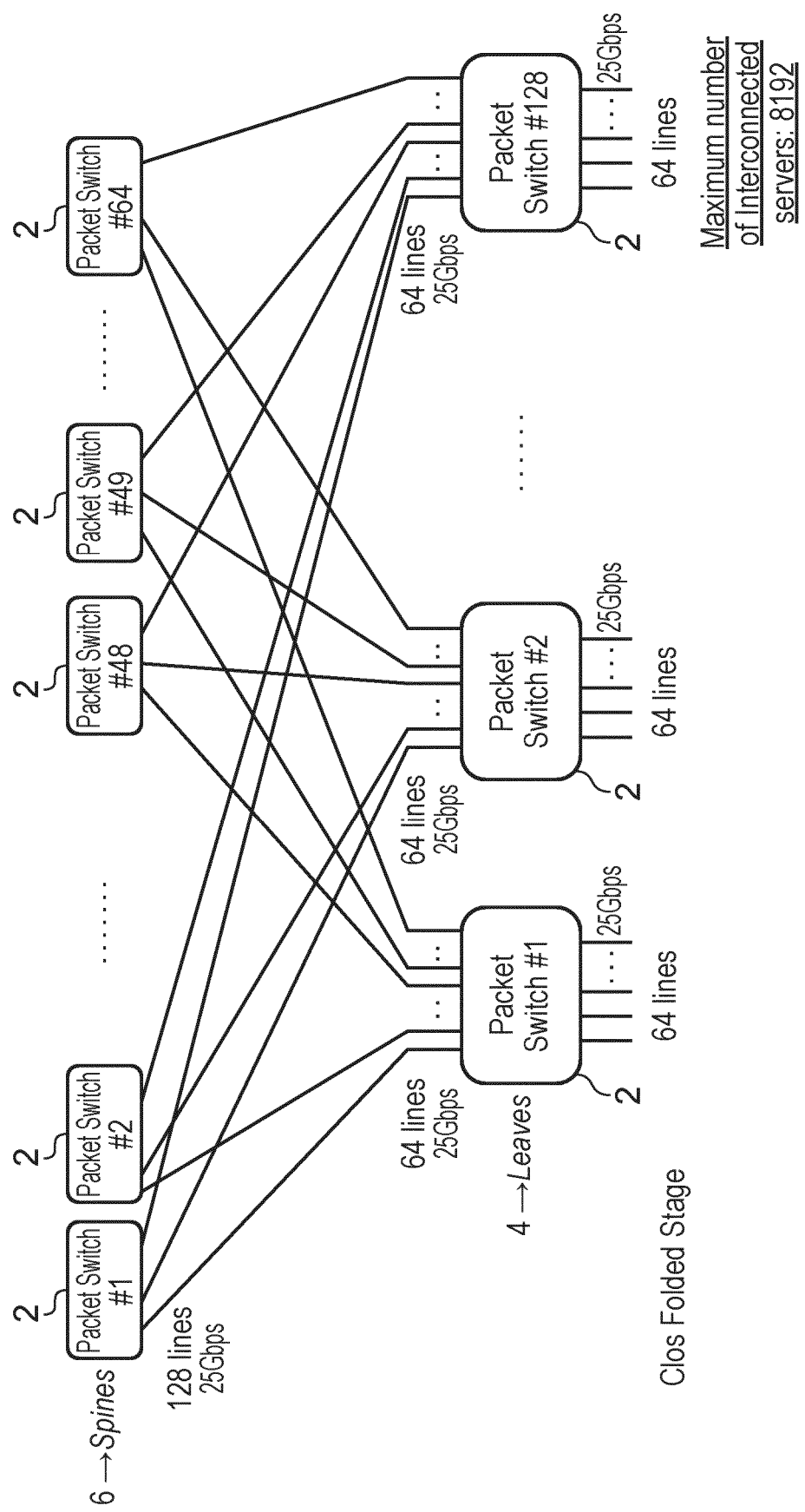
FIG. 1 illustrates an electrical packet switching architecture for a disaggregated data center.
Figure 2:
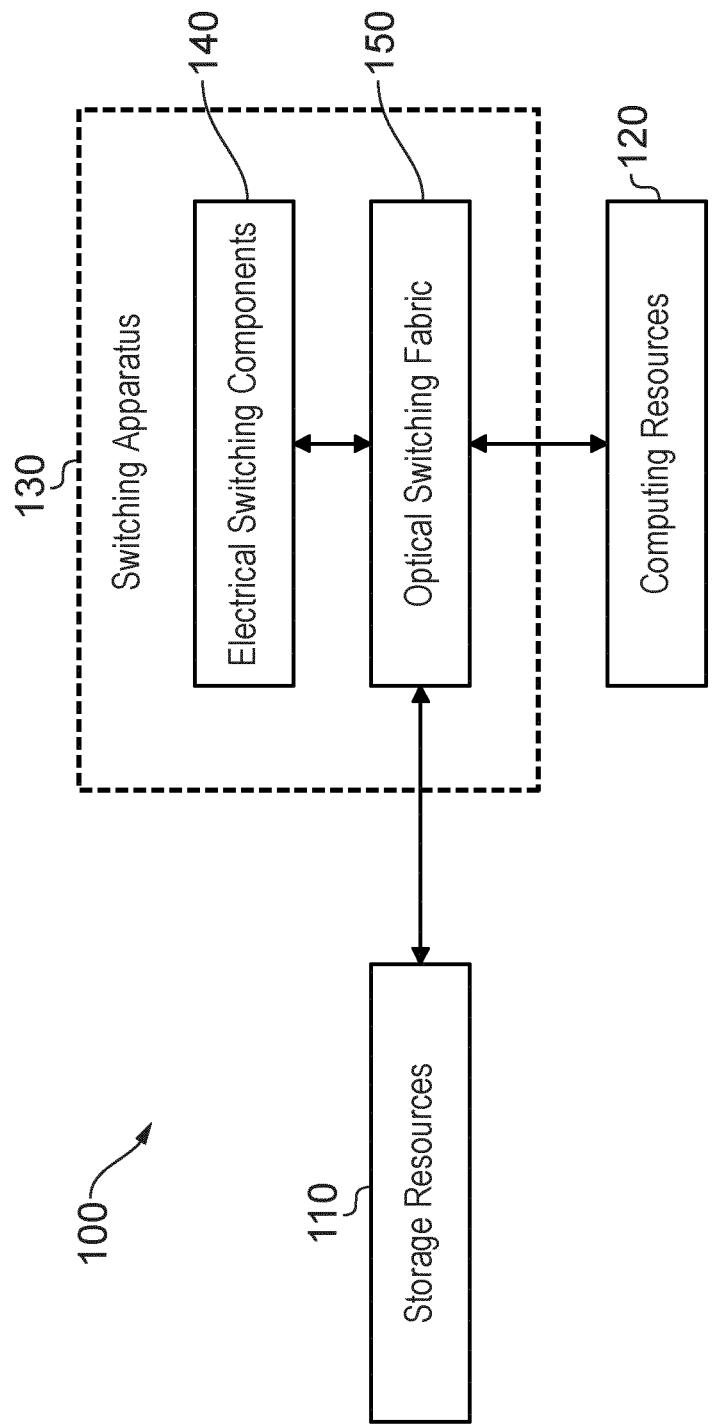
FIG. 2 is a block diagram illustrating a network for a data center.

FIG. 2 is a block diagram illustrating a first example of a network 100 for a data center according to aspects of the present disclosure. Referring to FIG. 2, the network 100 comprises computing resources 120, storage resources 110, and a switching apparatus 130. The switching apparatus 130 comprises a plurality of electrical switching components 140 configured to provide packet switching for traffic between computing resources or between computing and storage resources. The switching apparatus further comprises an optical switching fabric 150 configured to select an electrical switching component to provide packet switching between computing resources and to provide connectivity between the plurality of electrical switching components and the computing and storage resources.

In examples of the network 100, for traffic to be directed from a source computing resource (or storage resource) to a destination computing resource (or storage resource), the optical switching fabric 150 may be configured to convey the traffic from the source computing resource to a selected one of the plurality of electrical switching components 140. In some examples, the source and destination computing resources are both located within the computing resources 120. The selected one of the plurality of electrical switching components 140 may be configured to packet switch the traffic to a selected port on a module of the optical switching fabric 150, and the optical switching fabric may be configured to convey the packet switched traffic to the destination computing resource.

In some examples of the network 100, the optical switching fabric may be configured to provide direct communication between computing resources 120 and storage resources 110, such that for traffic from an origin computing resource to a destination storage resource, for example, the optical switching fabric 150 may be configured to convey the traffic directly from the computing resource to the storage resource, without the traffic being packet switched by one of the electrical switching components 140. In other examples of the network 100, traffic between a computing resource and a storage resource may be packet switched, with the optical switching fabric 150 providing connectivity between the computing resources, storage resources and a selected electrical switching component 140 as described above for traffic between computing resources 120.

Examples of the network 100 comprise a Software Defined Network (SDN), and the network 100 may further comprise an SDN controller (not shown), which may configure the storage resources 110, computing resources 120 and electrical switching components 140 to form vPODs, as discussed in further detail below. The computing resources 120 and storage resources 110 of the network 100 may be disaggregated. As discussed above, the disaggregated resources may be physically separated and placed in pools such that they may be allocated to vPODs dynamically, independently of their physical location. The computing resources may in some examples be servers and the storage resources may be any form of storage.

Examples of the network 100 enable separation of the functions of providing vPOD connectivity and providing vPOD packet communication. vPOD connectivity among computing resources and storage resources is accomplished by the optical switching fabric 150, while packet switching functions for intra vPOD server communication is accomplished by smaller electrical switching components 140. This separation allows for the development of a flexible deployment scheme for interconnection topology. This deployment may be both low power and low cost, thanks in part to the availability of silicon photonic switches, which may be used to construct the optical switching fabric 150, as discussed in further detail below.

Figure 3:
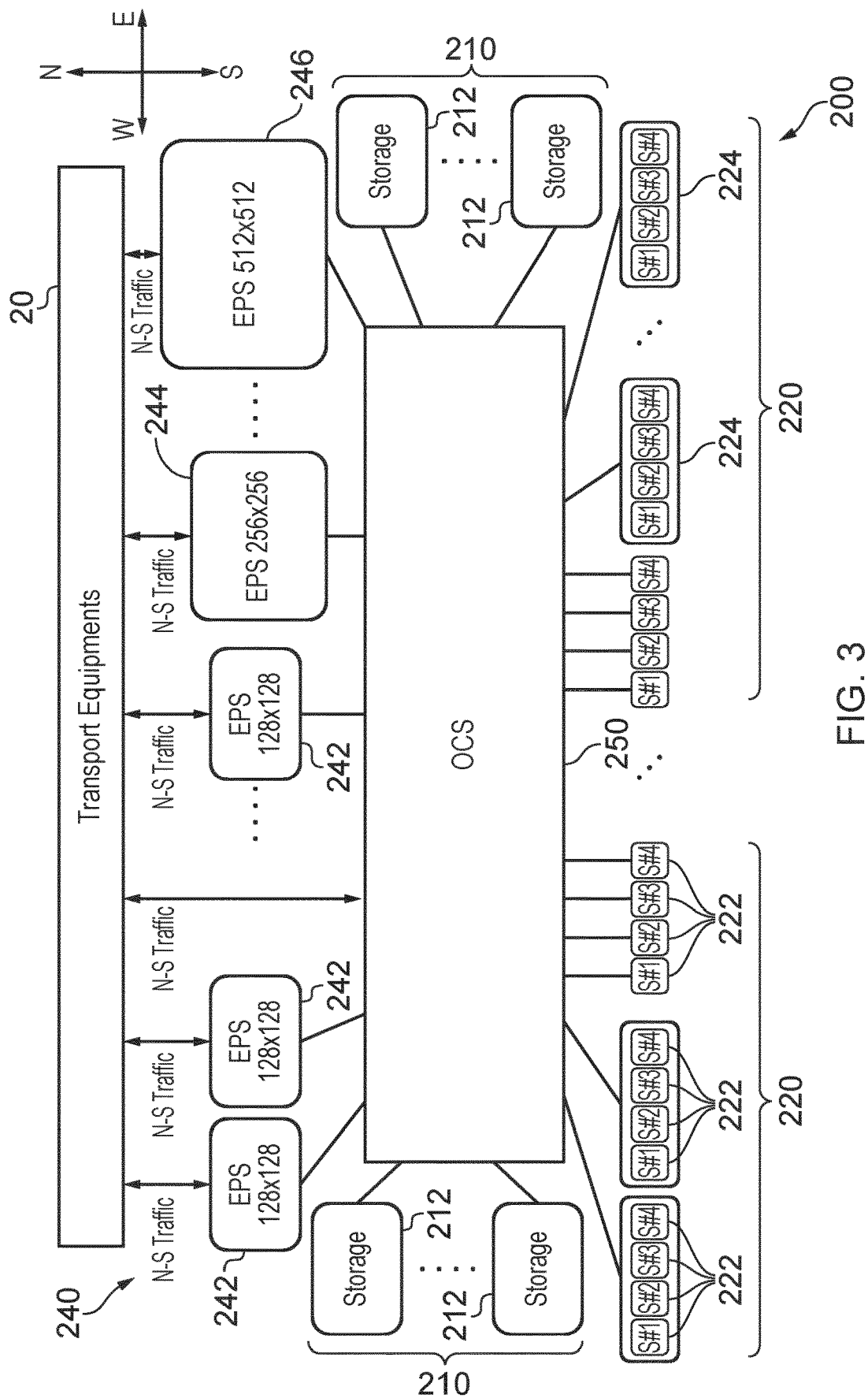
FIG. 3 illustrates another example of a network for a data centre.

FIG. 3 illustrates another example of network 200, in which component parts of the network 100 are shown in greater detail. Referring to FIG. 3, the network 200 comprises storage resources 210, illustrated as individual storage units 212. The network 200 further comprises computing resources 220 comprising individual servers 222. The network 200 further comprises a switching structure formed from an optical switching fabric 250 and a plurality of electrical switching components 240.

The plurality of electrical switching components 240 comprises Electrical Packet Switches (EPSs) 242. In the illustrated example, the EPSs are arranged in a single stage architecture, with each EPS being directly connected to the optical switching fabric 250 as opposed to being connected via another EPS. In alternative examples (not shown), the EPSs may be arranged in a multi stage architecture with many EPSs interconnected to increase the overall packet switching capacity provided by the electrical switching components 240. As illustrated in FIG. 3, the EPSs may be of varying sizes, and may for example include EPSs of 128×128, 256×256 and/or 512×512. The size of EPS required in the network 200 depends on the size of the vPOD to which the EPS will be assigned, which in turn depends upon the workload that will be assigned to that vPOD. Mean vPOD size may for example be less than 100 compute and storage nodes. However larger size vPODs could be required for a small number of large workloads. In order to provision such larger vPODs, some bigger EPSs, for example of size 515×512 may be included. The data to be transmitted may be considered as packet data, i.e. the data is arranged in data packets for connection-less communication in which each packet of data is a unit which is individually addressed and routed based on information carried in each unit.

The optical switching fabric comprises at least one Optical Cross Connect (OXC), illustrated in FIG. 3 as an Optical Circuit Switch (OCS). The OCS comprises a plurality of optical switching modules, each of which may comprise a silicon photonic switch or a photonic integrated switch, offering relatively low cost and power consumption. The optical switching modules may for example be 64×64 switches.

The optical switching modules of the OCS 250 may be arranged in a multi-stage architecture. A Clos architecture, and in particular a two stage folded Clos architecture, are examples of possible multi-stage architectures, although these are merely examples, and other multi-stage architectures may be envisaged.

As illustrated in FIG. 3, at least some of the computing resources may be aggregated for connection to the Optical switching fabric 250. Thus some servers 222 are illustrated in FIG. 3 as directly connected to the OCS 250, while other servers 222 are aggregated into server groups 224, with the server group 224 being connected to the OCS 250. Server aggregation is discussed in further detail below with reference to FIGS. 4a to 4c.

FIG. 3 illustrates both data center West-East communication and North-South communication. West-East communication is for intra-data center traffic, while North-South communication is for inter-data center traffic (communication to outside the data center) and is accomplished through dedicated transport equipments 20 by an external transport network. The switching apparatus formed by the plurality EPSs 240 and the OCS 250 may thus be configured to provide connectivity between the computing and storage resources 220, 210 and an external transport network 20. The external transport network may connect the network 200 to a public network such as the Internet, and via the Internet to end users and/or to other networks in other data centers. Either or both of the OCS 250 and/or at least one of the EPSs 242 may be connected to the external transport network 20, and so may receive incoming traffic to the network 200. If at least one of the EPSs 242 is directly connected to the external transport network 20 then at least a portion of ports on the EPS 242 may be reserved for traffic exchanged with the external transport network, as discussed in further detail below with reference to FIGS. 4a to 4c.

Figure 4A:
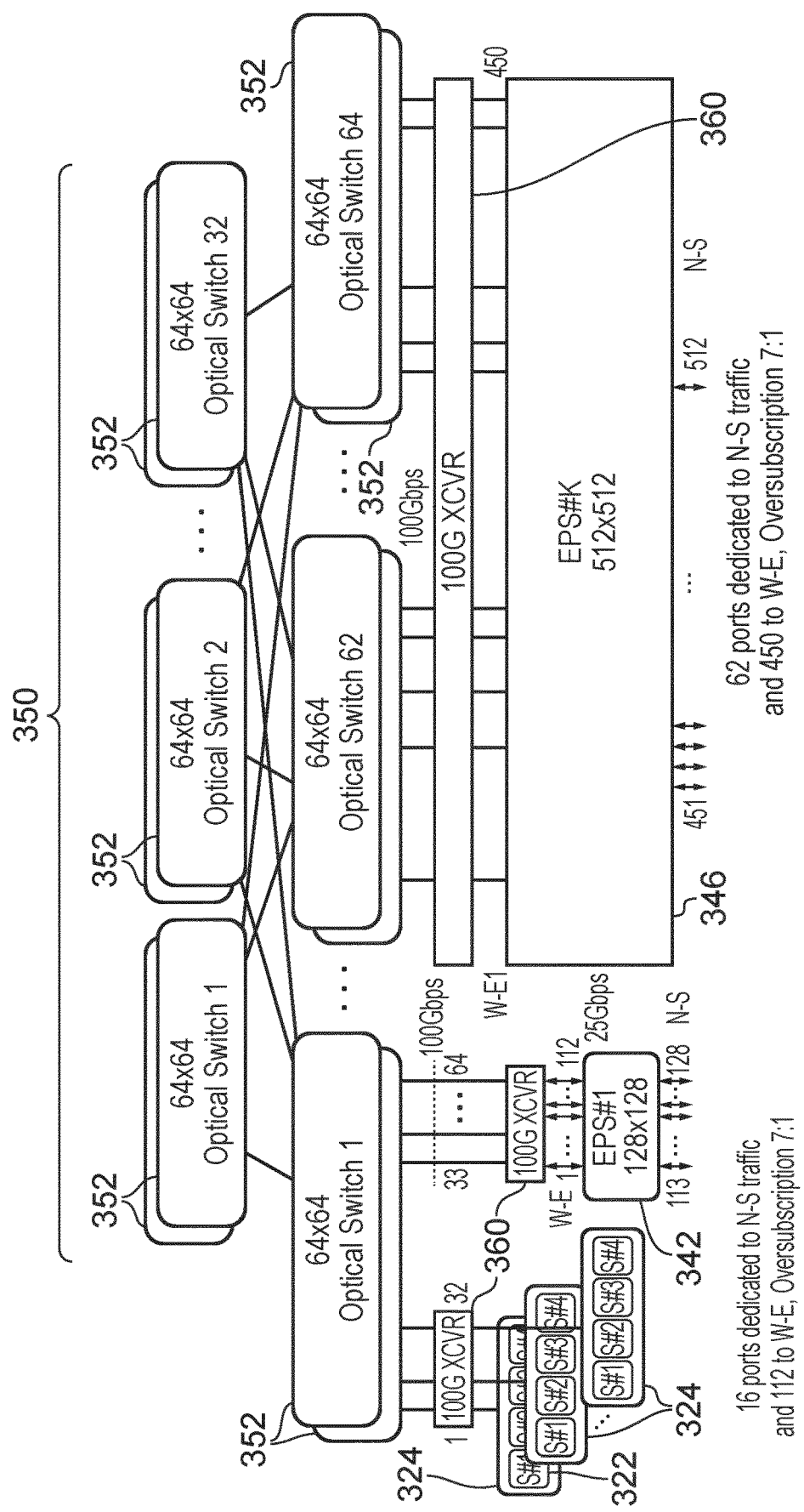
FIG. 4a illustrates an example of a partial implementation of the network of FIG. 3.
Figure 4B:
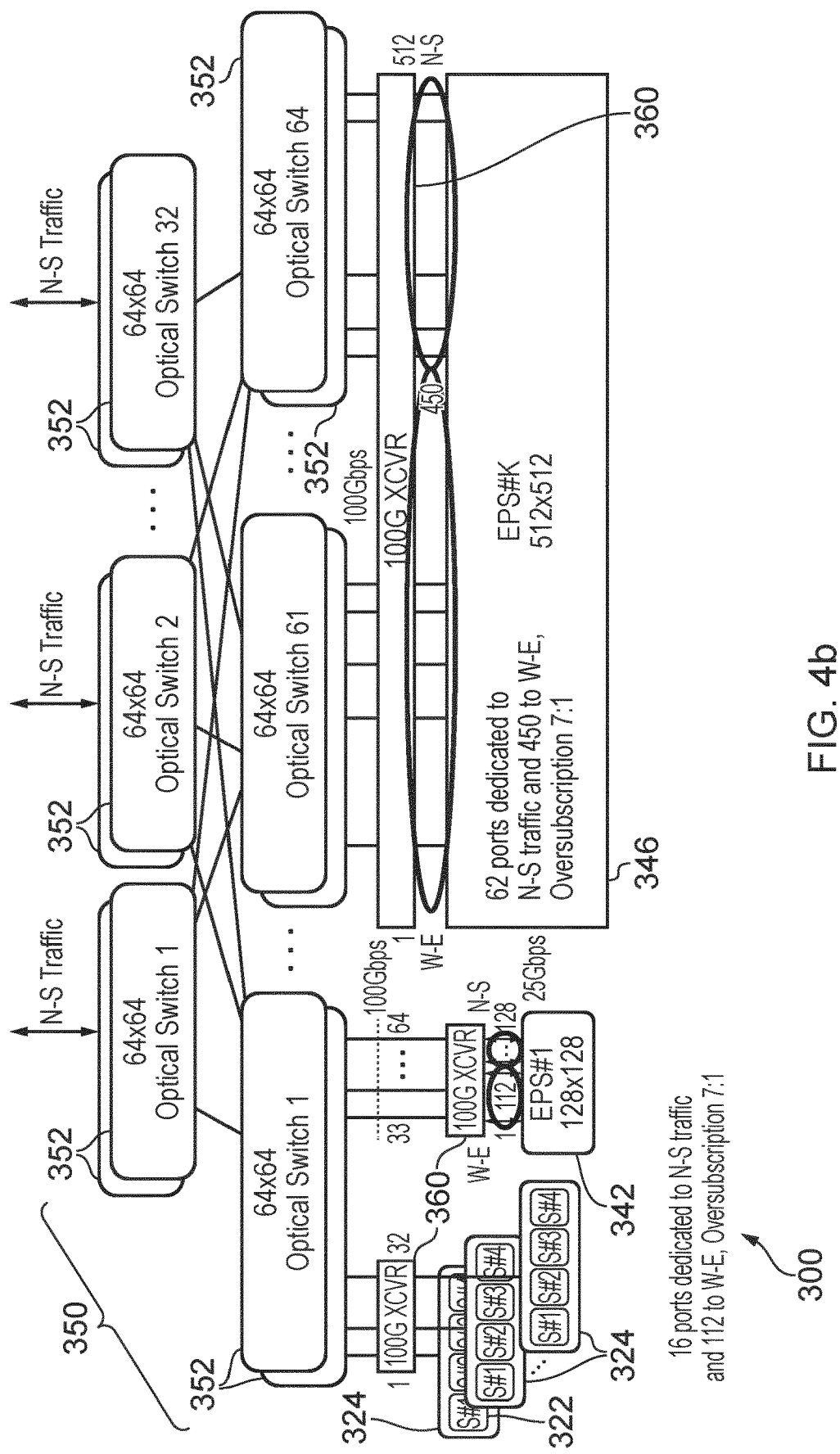
FIG. 4b illustrates another example of a partial implementation of the network of FIG. 3.
Figure 4C:
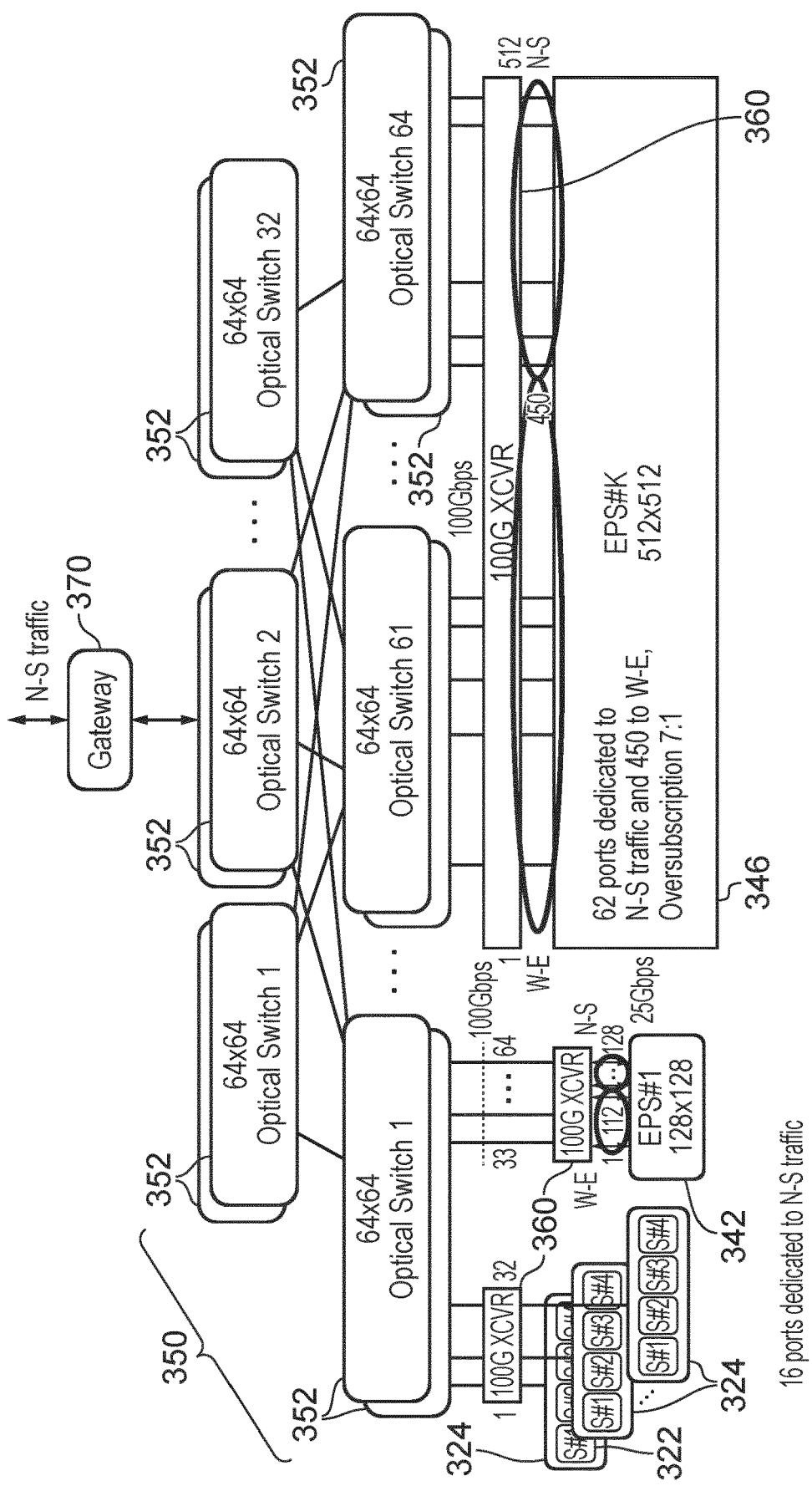
FIG. 4c illustrates another example of a partial implementation of the network of FIG. 3.

FIGS. 4a to 4c illustrate example partial implementations of the network 200. Each example implementation 300 comprises computing resources 320 in the form of servers 322 aggregated into server groups 324. Each implementation 300 also comprises an optical switching fabric in the form of an OCS 350 comprising a plurality of optical switching modules 352, a first EPS 342 and a second EPS 346. Both the server groups 324 and the EPSs 342, 346 are connected to the OCS via transceivers 360. Storage resources are not illustrated in the implementations 300, but may be present and connected with a similar architecture to the OCS 350.

The 64×64 optical switching modules of the OCS 350 are connected using a two stage folded Clos architecture, although as discussed above any other multi-stage interconnect architecture is possible. With the architecture illustrated in FIGS. 4a to 4c, the maximum number of interconnected servers is fixed, but a different number of servers may be connected by using a suitable OCS fabric. As discussed above, the optical switching modules may be silicon photonic switches, as low cost, miniaturised silicon photonic integrated devices with 64 input and 64 output ports are now being prototyped using different technologies including MEMS and Mach-Zehnder.

As discussed above with reference to FIG. 3, computing resources may be aggregated for connection to the OCS 350. This may enable a more efficient use of the wide bandwidth of the OCS ports. For example, as illustrated in the Figures, four server network interfaces at 25 Gbps may be aggregated into one 100 Gbps interface by using 100 Gbps transceivers (XCVR) 360 at the input/output of the OCS. In another example, with each server having four 25 Gbps interfaces, the flexibility provided by OCS may be exploited by dynamically interconnecting two of such interfaces to a first EPS and the other two interfaces to another EPS, belonging to a different vPOD. Alternatively, all four interfaces can be directed to the same EPS and then to the same vPOD. This flexibility is in contrast to existing data center network architectures, according to which it must be decided at installation where each single optical interface is connected.

Also as discussed above, in order to cope with the requirements of vPODs of different sizes, EPSs with different numbers of ports may be used. In the example implementations 300, two types of EPS are displayed, 128×128 and 512×512, but any other size can be used.

Traffic to be conveyed in different directions may be handled by the OCS 350 in different ways. In the example implementations 300, each optical switching module is duplicated, with one module handling traffic in a first direction and its duplicate handling traffic in a second direction. Thus in effect the optical switching fabric may comprise two optical cross connects, or OCSs, a first OCS configured to convey traffic in a first direction between the electrical switching components and the computing and storage resources, and a second OCS configured to convey traffic in a second direction between the electrical switching components and the computing and storage resources. The first OCS may also be configured to convey traffic in a first direction between computing and storage resources, and the second OCS may be configured to convey traffic in a second direction between computing and storage resources. Thus each optical switching module may operate in a single transmission direction. Consequently, traffic to be exchanged for example between computing resources, which traffic has been packet switched by an EPS, will be returned by the EPS to the appropriate port of the appropriate switching module for being conveyed back towards the computing resources. This may be a different optical switching module to that which conveyed the traffic from the computing resources towards the EPS.

In other examples, at least a portion of the capacity of the OCS may be reserved for traffic in the first direction between the electrical switching components and the computing and storage resources and at least a portion of the capacity of the OCS may be reserved for traffic in the second direction between the electrical switching components and the computing and storage resources. This separation of the OCS may be achieved by partitioning each optical switching module, such that for example half of the ports of each module are reserved for traffic in the first direction, with the other half of the ports reserved for the traffic in the second direction.

The three implementations 300 of FIGS. 4a to 4c differ only in the way the West-East (W-E) and North South (N-S) traffic are handled. The assumed oversubscription taken as an example is 7:1, but any other value of the oversubscription may be used.

Referring initially to FIG. 4a, the EPSs 342, 346 may be directly connected to the external transport network 20, with a portion of the bandwidth of each EPS reserved for N-S traffic. This is achieved by permanently assigning at least some of the ports of each EPS for N-S traffic, with the remaining ports handling W-E traffic. With the oversubscription factor of 7:1 discussed above, in the example of FIG. 4a, 16 ports of the EPS 342 are dedicated to N-S traffic and the remaining 112 ports are dedicated to W-E traffic. In the EPS 346, 62 ports are dedicated to N-S traffic and the remaining 450 ports are dedicated to W-E traffic. A disadvantage of the arrangement of FIG. 4a is that the assignment of ports to N-S and W-E traffic is permanent, and can only be modified by physical intervention, and not by software.

A more flexible approach is offered by the implementation of FIG. 4b, in which N-S traffic is first routed through the optical switching modules 352 of the OCS 350. While an oversubscription factor of 7:1, and the same proportion of port assignment in the EPSs are illustrated in FIG. 4b as in FIG. 4a, this assignment is flexible. Routing the N-W traffic through the OCS allows for changes to be made in port assignment and oversubscription factor via software control.

Even greater flexibility maybe offered by the implementation of FIG. 4c, in which N-S traffic is routed through a gateway 370 between the transport network 20 and the OCS 350. The gateway 370 allows for N-S traffic aggregation.

Figure 5:
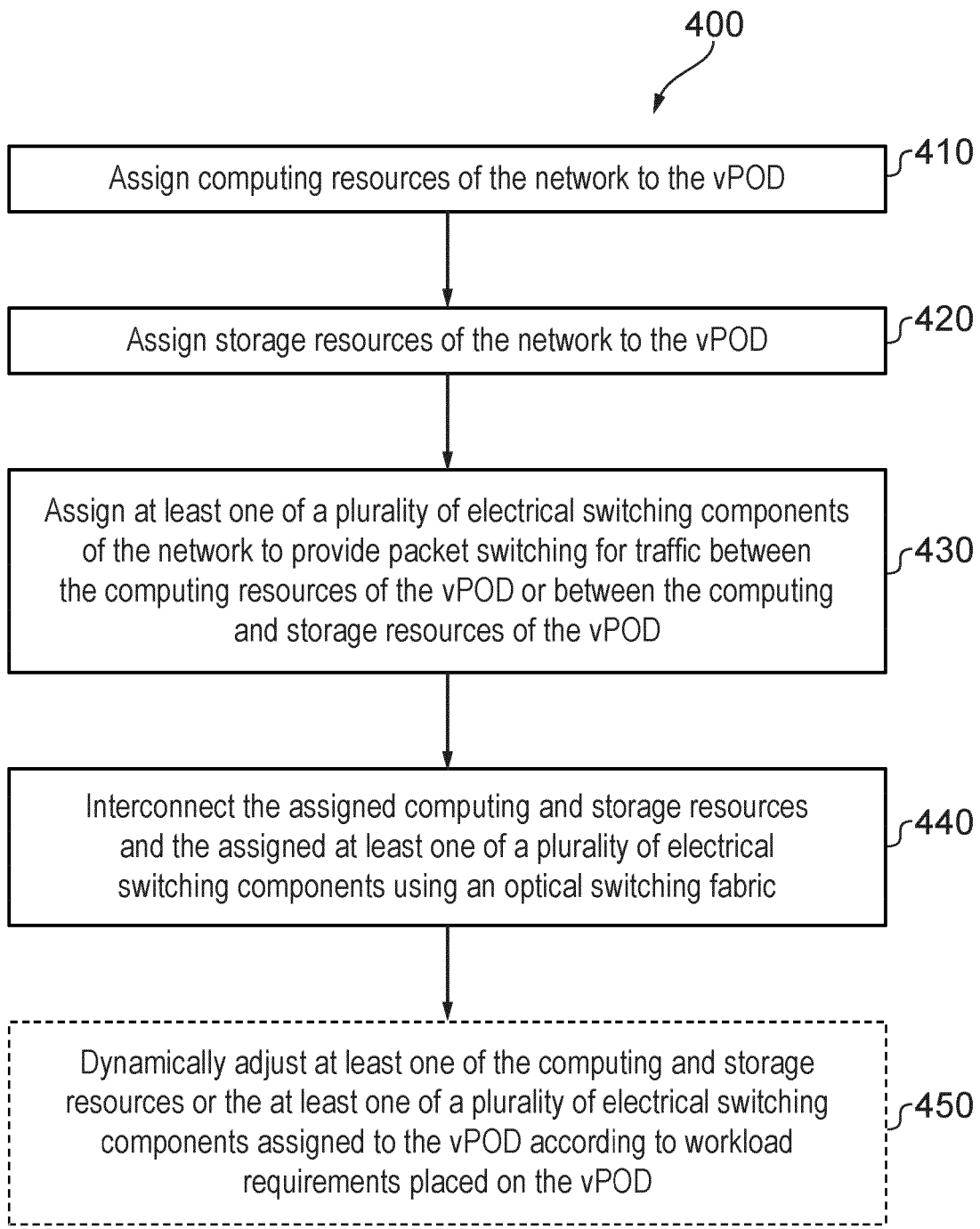
FIG. 5 illustrates process steps in a method for configuration of a vPOD in a network.

As discussed above, the network 200 and implementations 300 facilitate the efficient configuration of vPODs within the network. FIG. 5 illustrates process steps in an example method 400 for configuring a vPOD in a network, which may be network 100, 200 or 300 as described above. The method 400 may for example be performed by an SDN controller of such a network. With reference to FIG. 5, the method comprises assigning computing resources of the network to the vPOD in step 410, and assigning storage resources of the network to the vPOD in step 420. The method further comprises assigning at least one of a plurality of electrical switching components of the network to provide packet switching for traffic between the computing resources of the vPOD or between the computing and storage resources of the vPOD in step 430. The method further comprises interconnecting the assigned computing and storage resources and the assigned at least one of a plurality of electrical switching components using an optical switching fabric in step 440. The interconnection provided by the optical switching fabric provides a re-configurable optical connection between a source computing or storage resource and an electronic packet switch. In some aspects, the electronic packet switch is configured to packet switch the data, e.g. based on a destination address in a header of the data packet. In some examples, the optical switching fabric is further configured to provide a re-configurable optical connection between the electronic packet switch and a destination computing or storage resource.

The connections established may provide for communication between computing or storage resources within the data center (i.e. intra-data center) or between an external computing or storage resource located externally of the data center and a computing or storage resource within the data center.

Thus, the interconnecting 440 provides for packet data to be communicated between computing or storage resources within the data center to be directed by the optical switching fabric to electrical switching components 240, and then through a same or different part of the optical switching fabric to another of the computing or storage resources. Thus, a same data packet is switched using both the optical switching fabric and an electronic packet switch. The optical switching fabric is configured with first and second connections to provide an intra-data center connection. The optical switching fabric may be considered as adjacent to the computing or storage resources. In some examples, e.g. for intra-data center communication, transmitted data is packet switched only after passing through the optical switching fabric. The packet switched data is not directly switched to a computing or storage resource, but instead onto the optical switching fabric configured to connect to the destination computing or storage resource.

The method may further comprise dynamically adjusting at least one of the computing and storage resources or the at least one of a plurality of electrical switching components assigned to the vPOD according to workload requirements placed on the vPOD.

Figure 6:
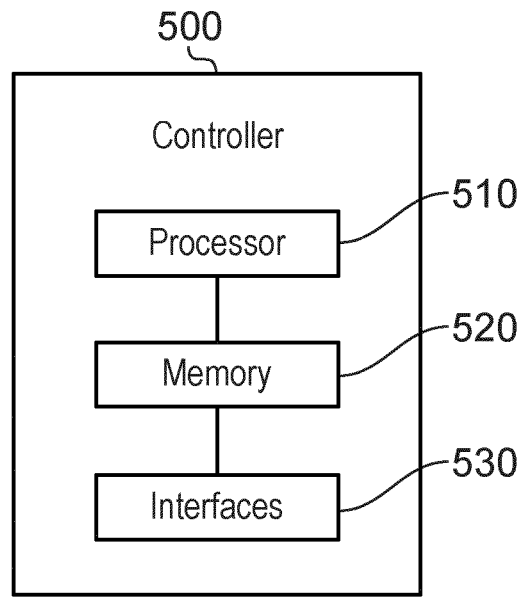
FIG. 6 is a block diagram illustrating functional units in a controller.

FIG. 6 illustrates first example of a controller, which may be an SDN controller, and which may implement the method 400 of FIG. 5, for example on receipt of suitable instructions from a computer program. Referring to FIG. 6, the controller 500 comprises a processor 510, a memory 520 and interfaces 530. The memory 520 contains instructions executable by the processor 510 such that the controller 500 is operative to conduct some or all of the steps of the method 500. In some aspects, the controller is arranged to configure the optical switching fabric to provide an optical connection between the computing resources and/or storage resources for data communication and a selected packet switch. As such, the controller is configured to establish optical cross-connections to allow the packet switched data to be transmitted from a computing resource or storage resource to a packet switch, and also from the packet switch to another computing resource or storage resource. In some aspects, the controller is arranged to configure the packet switches to operate as described.

Figure 7:
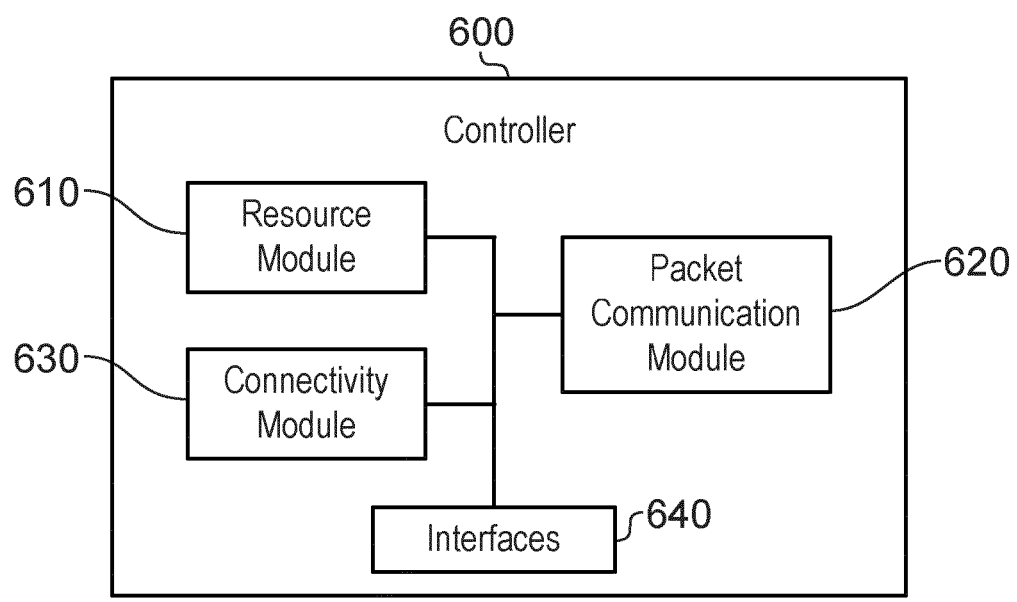
FIG. 7 is a block diagram illustrating functional units in another example of controller.

FIG. 7 illustrates functional modules in another example of a controller, which may also be an SDN controller, and which may implement the method 400 of FIG. 5, for example on receipt of suitable instructions from a computer program. It will be understood that the modules illustrated in FIG. 7 are functional modules, and may be realised in any appropriate combination of hardware and/or software. The modules may comprise one or more processors and may be integrated to any degree.

Referring to FIG. 7, the controller comprises a resource module 610 for assigning computing resources of the network to the vPOD and for assigning storage resources of the network to the vPOD. The controller further comprises a packet communication module 620 for assigning at least one of a plurality of electrical switching components of the network to provide packet switching for traffic between the computing resources of the vPOD or between the computing and storage resources of the vPOD. The controller also comprises a connectivity module 630 for interconnecting the assigned computing and storage resources and the assigned at least one of a plurality of electrical switching components using an optical switching fabric, and interfaces 640.

Aspects of the present disclosure thus provide a network for a data center which makes use of an optical switching fabric to provide extended, future-proof and software controlled connectivity to any data center resources. According to examples of the present disclosure, the size of electrical packet switches may be considerably reduced compared to existing network architectures, with these switches being used only to provide packet switching functions and communication to servers inside each vPOD. Resource connectivity is provided by an optical switching fabric. Electrical packet switches in a network according to examples of the present disclosure may be considered by the optical switching fabric as resources in pool similar to computing or storage resources, which resources may be connected to configure a vPOD. A fully flexible data center with a generalized connectivity (valid for all types of signals and protocols) and dynamically controlled by software may be realized with a network according to examples of the present disclosure. The use of an optical switching fabric for connectivity, instead of a huge EPS fabric for both connectivity and packet switching, allows a significant reduction in cost, footprint and power consumption. This reduction may be enhanced by using integrated photonic switches to form the optical switching fabric. Networks according to examples of the present disclosure are transparent to both protocol and bit rate, ensuring the networks are future-proof, and can adapt to changes in protocol and bitrate which may be required with future evolution of mobile communication.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A network for a data center, the network comprising:
   computing resources;
   storage resources; and
   a switching apparatus, wherein the switching apparatus comprises:
      a plurality of electrical switching components configured to provide packet switching for traffic between the computing resources or between the computing and storage resources; and
      an optical switching fabric configured to select electrical switching components to provide packet switching between the computing resources and to provide connectivity between the plurality of electrical switching components and the computing and storage resources.

2. The network as claimed in claim 1, wherein, for traffic from a source computing resource to a destination computing resource:
   the optical switching fabric is configured to convey the traffic from the source computing resource to a selected one of the plurality of electrical switching components;
   the selected one of the plurality of electrical switching components is configured to packet switch the traffic to a selected port on a module of the optical switching fabric; and
   the optical switching fabric is configured to convey the packet switched traffic to the destination computing resource.

3. The network as claimed in claim 1, wherein the network comprises a Software Defined Network (SDN) and further comprises an SDN controller.

4. The network as claimed in claim 1, wherein the computing and storage resources are disaggregated.

5. The network as claimed in claim 1, wherein the plurality of electrical switching components comprises Electrical Packet Switches (EPSs).

6. The network as claimed in claim 1, wherein the optical switching fabric comprises at least one Optical Cross Connect (OXC), the OXC comprising a plurality of optical switching modules.

7. The network as claimed in claim 6, wherein the optical switching modules comprise at least one of:
   silicon photonic switches; and
   photonic integrated switches.

8. The network as claimed in claim 6, wherein the optical switching fabric comprises:
   a first OXC configured to convey traffic in a first direction between the electrical switching components and the computing and storage resources; and
   a second OXC configured to convey traffic in a second direction between the electrical switching components and the computing and storage resources.

9. The network as claimed in claim 6, wherein at least a portion of the capacity of the OXC is reserved for traffic in a first direction between the electrical switching components and the computing and storage resources and at least a portion of the capacity of the OXC is reserved for traffic in a second direction between the electrical switching components and the computing and storage resources.

10. The network as claimed in claim 9, wherein each optical switching module of the OXC is partitioned to separate traffic in the first and second directions.

11. The network as claimed in claim 6, wherein the optical switching modules of the OXC are connected in a multi-stage architecture.

12. The network as claimed in claim 1, wherein at least some of the computing resources are aggregated for connection to the optical switching fabric.

13. The network as claimed in claim 1, wherein the switching apparatus is configured to provide connectivity between the computing and storage resources and an external transport network.

14. The network as claimed in claim 13, wherein at least one of the electrical switching components or the optical switching fabric is connected to the external transport network.

15. The network as claimed in claim 13, further comprising a gateway between the external transport network and the optical switching fabric of the switching apparatus.

16. A method for configuring a Virtual Performance Optimized Data Center (vPOD) in a network, the method comprising:
   assigning computing resources of the network to the vPOD;
   assigning storage resources of the network to the vPOD;
   assigning at least one of a plurality of electrical switching components of the network to provide packet switching for traffic between the computing resources of the vPOD or between the computing and storage resources of the vPOD; and
   interconnecting the assigned computing and storage resources and the assigned at least one of the plurality of electrical switching components using an optical switching fabric.

17. The method as claimed in claim 16, further comprising dynamically adjusting at least one of the computing and storage resources or the at least one of the plurality of electrical switching components assigned to the vPOD, according to workload requirements placed on the vPOD.

18. A controller configured for configuring a Virtual Performance Optimized Data Center (vPOD) in a network, the controller comprising:
   a processor; and
   a memory, the memory containing instructions executable by the processor such that the controller is operable to:
      assign computing resources of the network to the vPOD;
      assign storage resources of the network to the vPOD;
      assign at least one of a plurality of electrical switching components of the network to provide packet switching for traffic between the computing resources of the vPOD or between the computing and storage resources of the vPOD; and interconnect the assigned computing and storage resources and the assigned at least one of the plurality of electrical switching components using an optical switching fabric.

* * * * *